United States Patent
Mueller et al.

(10) Patent No.: US 12,190,605 B2
(45) Date of Patent: *Jan. 7, 2025

(54) DUAL USE OF SAFETY-CAPABLE VEHICLE SCANNER FOR COLLABORATIVE VEHICLE ASSEMBLY AND DRIVING SURVEILLANCE

(71) Applicant: Infineon Technologies Austria AG, Villach (AT)

(72) Inventors: Clemens Mueller, Munich (DE); Harald Heinrich, Freital-Pesterwitz (DE)

(73) Assignee: Infineon Technologies Austria AG, Villach (AT)

( * ) Notice: Subject to any disclaimer, the term of this patent is extended or adjusted under 35 U.S.C. 154(b) by 84 days.

This patent is subject to a terminal disclaimer.

(21) Appl. No.: 17/936,976

(22) Filed: Sep. 30, 2022

(65) Prior Publication Data

US 2023/0025322 A1   Jan. 26, 2023

Related U.S. Application Data

(63) Continuation of application No. 16/784,701, filed on Feb. 7, 2020, now Pat. No. 11,514,684.

(51) Int. Cl.
*G06V 20/58* (2022.01)
*B25J 9/16* (2006.01)
(Continued)

(52) U.S. Cl.
CPC ............ *G06V 20/58* (2022.01); *B25J 9/1676* (2013.01); *B62D 65/00* (2013.01); *B62D 65/005* (2013.01);
(Continued)

(58) Field of Classification Search
CPC ... B06K 31/0008; B25J 9/1666; B25J 9/1676; B60R 21/01512; B60R 2300/804;
(Continued)

(56) References Cited

U.S. PATENT DOCUMENTS 10,872,514 B1   12/2020   Glatfelter et al.
2013/0158709 A1   6/2013   Shi et al.
(Continued)

FOREIGN PATENT DOCUMENTS

EP   2706384 A1   3/2014
WO   2018148181 A1   8/2018

OTHER PUBLICATIONS

U.S. Appl. No. 62/811,073, filed Feb. 27, 2019, Denenberg, Scott et al., (inventor) cited by United States Patent Application Publication # US 2020/0156722 A1 (Year: 2019).*

(Continued)

*Primary Examiner* — Stephen R Burgdorf
(74) *Attorney, Agent, or Firm* — Harrity & Harrity, LLP

(57) ABSTRACT

A vehicle assembly system includes a vehicle chassis of a vehicle; at least one object sensor mounted to the vehicle chassis, where the at least one object sensor generates sensor data based on at least one detected object; a vehicle controller mounted to the vehicle chassis and configured to receive the sensor data from the at least one object sensor, where, during assembly, the vehicle controller is configured with production control software that enables the vehicle controller to generate production object data from the sensor data, monitor for a safety event based on the production object data, and generate a safety event signal in response to detecting the safety event; and a safety controller configured to receive the safety event signal from the vehicle controller and alter a movement of a surveilled machine corresponding to the safety event.

21 Claims, 3 Drawing Sheets

(51) Int. Cl.
*B62D 65/00* (2006.01)
*G05B 19/418* (2006.01)

(52) U.S. Cl.
CPC ..... *G05B 19/418* (2013.01); *G05B 19/41805* (2013.01); *G06V 20/582* (2022.01); *B60R 2300/804* (2013.01); *B60R 2300/806* (2013.01)

(58) Field of Classification Search
CPC ............ B60R 2300/806; B60W 30/09; B60W 50/0205; B60W 60/001; B60W 60/0011; B62D 15/025; B62D 65/00; B62D 65/005; F16P 3/142; G05B 19/418; G05B 19/41805; G05B 19/41885; G05B 2219/40202; G05B 2219/40203; G05D 1/0088; G05D 1/0212; G05D 1/0214; G05D 1/0297; G06K 9/6257; G06V 20/58; G06V 20/582; G07C 5/0808; H04N 7/181; Y02P 90/02
USPC .......................................................... 701/36
See application file for complete search history.

(56) References Cited

U.S. PATENT DOCUMENTS

| | | |
|---|---|---|
| 2014/0260795 A1 | 9/2014 | Gray et al. |
| 2016/0214261 A1* | 7/2016 | Davis ...................... B25J 19/06 |
| 2018/0276910 A1 | 9/2018 | Pitt et al. |
| 2018/0339456 A1* | 11/2018 | Czinger ................. B33Y 30/00 |
| 2019/0160675 A1 | 5/2019 | Paschall, II et al. |
| 2019/0286112 A1 | 9/2019 | Morris |
| 2019/0325180 A1 | 10/2019 | Lee |
| 2019/0329729 A1 | 10/2019 | Hilligardt et al. |
| 2019/0342152 A1 | 11/2019 | Troia et al. |
| 2020/0066159 A1 | 2/2020 | Chase |
| 2020/0156722 A1 | 5/2020 | Watkins et al. |
| 2020/0206928 A1* | 7/2020 | Denenberg .............. G01S 17/04 |
| 2020/0368861 A1* | 11/2020 | Artigas ................. G05D 1/0246 |
| 2021/0245738 A1 | 8/2021 | Mueller et al. |
| 2022/0088770 A1 | 3/2022 | Mellander et al. |

OTHER PUBLICATIONS

Casper et al., "Camera-based Technology Tracks People in Car Interiors," Fraunhofer, Aug. 2016, pp. 1-3, present in U.S. Appl. No. 16/784,701.

Hamamatsu., "Occupant Detection," Corporate Site Contact, Jul. 2, 2020, pp. 1-3, Retrieved from the Internet[URL: https://automotive.hamamatsu.com/eu/en/safety/occupant.html], [Retrieved online Jan. 23, 2020], Present in U.S. Appl. No. 16/784,701.

* cited by examiner

DUAL USE OF SAFETY-CAPABLE VEHICLE SCANNER FOR COLLABORATIVE VEHICLE ASSEMBLY AND DRIVING SURVEILLANCE

RELATED APPLICATION

This application is a continuation of U.S. patent application Ser. No. 16/784,701, filed Feb. 7, 2020, which is incorporated herein by reference in its entirety.

FIELD

The present disclosure relates generally to a sensor system and to methods for monitoring an environment during manufacturing using the sensor system.

BACKGROUND

Vehicle production and the final driving application are considered fully separated worlds today. Vehicle production refers to vehicle manufacturing or repair. In contrast, final driving application refers to operating the vehicle outside of vehicle production (e.g., driving the vehicle).

In vehicle manufacturing, only the chassis construction is fully automated, whereas vehicle assembly still is a highly manual labor-intense task and it is only—to a certain extent—tool-assisted. In order to further increase the level of automation, there is high demand for more intense deployment of robotic systems as part of the vehicle assembly process.

Unlike chassis building there is a much higher degree of flexibility in assembly for a vehicle setup. This requires a collaborative setup between human workers and smart machines. This need for flexibility and collaboration enforces an open workspace where humans and machines are no longer separated by protective fences.

Therefore, so called safety Light Detection and Ranging (LIDAR) scanners have become one possible solution to protect humans who are working in the same area in which machines are operating. These safety LIDAR scanners are arranged outside of a vehicle, around a perimeter of a workstation (i.e., a production cell), and are inwardly facing towards a vehicle chassis. Thus, the safety LIDAR scanners cover some of the areas in which humans and machines are operating.

Automation of complex assembly tasks requires not only smart safety solutions for collaborative setups, it also requires powerful solutions for robot and machine guidance within a highly complex three-dimensional (3D) working environment. Efficient solutions for identification, localization, and guiding of different machine parts (e.g., an articulated robot arm) to different chassis target positions, for identification and localization of components that are to be mounted within the vehicle, and for guidance for picking up those components (e.g., via an articulated robot arm) for mounting to the vehicle under assembly require highly efficient scanning sensor setups.

In common to all of the above scanning or imaging solutions for machine safety and functional guidance is the fact that the corresponding sensors have a fixed setup at the production cell or directly at the corresponding machine (e.g., the end-effector tool of the robot). Thus, the sensors are located outside and away from the vehicle and typically scan inwardly into the working environment in which humans may be working.

In contrast to this manufacturing centric scanning setup for automated vehicle production, there is an increasing number of separated scanning devices to be installed in and around the vehicle itself. These new scanning sensors (e.g., radar, Lidar, ultrasonic, RGB-camera, time-of-flight cameras, 3D cameras, etc.) are used in order to collect information on a vehicle's close and midrange environment for driving assistance (e.g., lane assist, parking assist, adaptive cruise control, traffic sign detection, etc.) and active (passenger) safety systems. These scanning sensors scan an exterior environment of a vehicle during post production (e.g., during operation). That is to say, these scanning sensors scan outwardly from the vehicle.

In addition, there is yet another set of scanning sensors to be installed inside the vehicle in order to obtain better surveillance capabilities within the vehicle's interior. That is to say, these scanning sensors scan an interior environment of a vehicle during post production. For example, next generation airbag systems may use sensors to determine a location and a position of each passenger located within the vehicle. This becomes even more important for autonomously driving vehicles, as people opt for different seating positions than what is more common in manually driven vehicles. In addition, face scanners are being introduced in order to support algorithms for early fatigue detection, antitheft, etc. Sensor-wise, time-of-flight 3D cameras, radar sensors, and so on may be used.

The production sensors used for vehicle production and vehicle sensors used for vehicle operation are completely decoupled from each other. Often the sensors used for vehicle operation are not activated until vehicle production is complete. Similarly, the algorithmic engines coupled to the production sensors and the algorithmic engines coupled to the vehicle sensors are completely decoupled and strictly separated with respect to their functional focus. Sensors and scanners on the vehicle itself are only in real functional use after the vehicle completed final manufacturing stage and is ready to enter traffic. In contrast, the manufacturing line needs to be equipped with thousands of additional scanning sensors and systems, which enable automated and safe vehicle production.

As a result, there is an increasing amount of superfluous duplication, which originates from the fact that vehicle sensors and production sensors are considered separate systems while both need to comply with functional safety standards. This causes extra costs within the production line. The costs may be realized both in the cost for each safety scanner used in the production line, as well wasted production space needed for the safety scanners and for more complex safeguarding setups for the production cells.

Therefore, an improved system that employs "dual-use" vehicle-installed (scanning) sensors for both vehicle production and vehicle operation may be desirable.

SUMMARY

One or more embodiments provide a vehicle assembly system that includes a vehicle chassis of a vehicle; at least one object sensor mounted to the vehicle chassis, wherein the at least one object sensor generates sensor data based on at least one detected object; a vehicle controller mounted to the vehicle chassis and configured to receive the sensor data from the at least one object sensor, wherein, during assembly, the vehicle controller is configured with production control software that enables the vehicle controller to generate production object data from the sensor data, monitor for a safety event based on the production object data, and generate a safety event signal in response to detecting the safety event; and a safety controller configured to receive the safety event signal from the vehicle controller and alter a movement of a surveilled machine corresponding to the safety event.

One or more embodiments provide a method of assembling a vehicle. The method includes mounting at least one object sensor to a vehicle chassis of the vehicle; mounting a vehicle controller to the vehicle chassis; generating, by the at least one object sensor, sensor data based on at least one object detected by the at least one object sensor; installing production control software in a memory of the vehicle controller; generating, by the vehicle controller based on the production control software, production object data from the sensor data; monitoring, by the vehicle controller based on the production control software, for a safety event based on the production object data; generating, by the vehicle controller based on the production control software, a safety event signal in response to detecting the safety event; and altering, by a safety controller, a movement of a surveilled machine corresponding to the safety event based on the safety event signal.

BRIEF DESCRIPTION OF THE DRAWINGS

Embodiments are described herein making reference to the appended drawings.

DETAILED DESCRIPTION

Figure 1A:
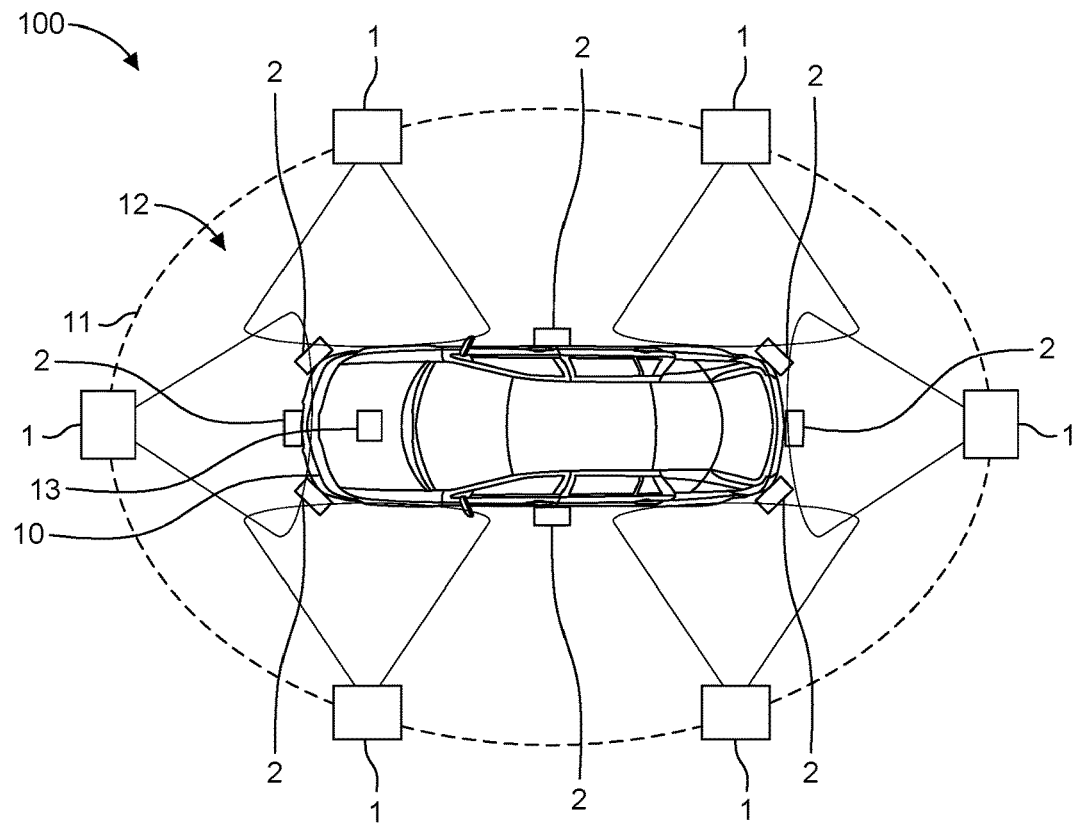
FIGS. 1A-1C illustrate a dual-use scanning system according to one or more embodiments.

In the following, various embodiments will be described in detail referring to the attached drawings. It should be noted that these embodiments serve illustrative purposes only and are not to be construed as limiting. For example, while embodiments may be described as comprising a plurality of features or elements, this is not to be construed as indicating that all these features or elements are needed for implementing embodiments. Instead, in other embodiments, some of the features or elements may be omitted, or may be replaced by alternative features or elements. In other instances, well-known structures and devices are shown in block diagram form or in a schematic view rather than in detail in order to avoid obscuring the embodiments.

Further, equivalent or like elements or elements with equivalent or like functionality are denoted in the following description with equivalent or like reference numerals. As the same or functionally equivalent elements are given the same reference numbers in the figures, a repeated description for elements provided with the same reference numbers may be omitted. Hence, descriptions provided for elements having the same or like reference numbers are mutually exchangeable.

Features from different embodiments may be combined to form further embodiments, unless specifically noted otherwise. Variations or modifications described with respect to one of the embodiments may also be applicable to other embodiments. In some instances, well-known structures and devices are shown in block diagram form rather than in detail in order to avoid obscuring the embodiments.

Connections or couplings between elements shown in the drawings or described herein may be wire-based connections or wireless connections unless noted otherwise. Furthermore, such connections or couplings may be direct connections or couplings without additional intervening elements or indirect connections or couplings with one or more additional intervening elements, as long as the general purpose of the connection or coupling (e.g., to transmit a certain kind of signal or to transmit a certain kind of information) is essentially maintained.

Embodiments relate to sensors and sensor systems used to obtain sensor data about an environment. A sensor may refer to a component which converts a physical quantity to be measured to an electric signal, for example, a current signal or a voltage signal. More specifically, embodiments relate to object sensors, including pressure sensors, contact switches (e.g., installed inside passenger seats), and scanning sensors that detect and/or measure magnetic or electromagnetic radiation (e.g., radio waves, microwaves, infrared light, and visible light) as the physical quantity in order to generate sensor data representative of a field-of-view (FOV) of a respective scanning sensor. Scanning sensors may include but are not limited to 3D magnetic sensors, radar sensors, Light Detection and Ranging (LIDAR) sensors, time-of-flight 3D cameras, ultrasonic sensors, RGB-cameras, charge-coupled device (CCD) sensors, and the like. Thus, some scanning sensors may also be referred to as an imaging sensor.

In addition, one or more processors may be configured to receive sensor data and convert the sensor data into object data and/or image data via signal processing. For example, one or more processors may generate two-dimensional (2D) and/or three-dimensional (3D) information using the sensor data generated by one or more scanning sensors. The 2D and 3D information may be object data, such as point cloud data, and one or more processors may be configured to detect and/or monitor objects in the FOV based on the sensor data generated by one or more scanning sensors. In this way, each scanning sensor may be used to monitor for, detect, classify, and track objects in its FOV. In addition, other types of sensors, such as pressure sensors and contact switches may be used for object detection. Thus, one or more processors may receive sensor data from one or more of these sensors to detect objects and generate object data.

Each object sensor may be arranged to monitor a corresponding area inside or outside the vehicle. For example, pressure sensors or contact switches may be installed inside passenger seats to monitor for objects coming in contact with the seats. Additionally, scanning sensors may be arranged to monitor a different sub-area (e.g., a different FOV). A central processor may be used to receive sensor data from each scanning sensor and monitor for, detect, classify, and track objects in each sub-area or FOV. The central processor may be integrated with a system controller that controls a system based on the information generated by the central processor (i.e., based on sensor data and detected objects in each FOV). The system may be, for example, a vehicle assembly system used in vehicle manufacturing. Thus, the system controller may include at least one processor and/or at least one processor circuitry (e.g., comparators and digital signal processors (DSPs)) of a signal processing chain for processing sensor data, as well as control circuitry, such as a microcontroller, that is configured to generate control signals. Additionally, a trained artificial neural network (aNN) (i.e., one or more processors programmed for aNN analysis) could also be used to analyze sensor data and assess valid and invalid position patterns and valid and invalid motion patterns.

Figure 1B:
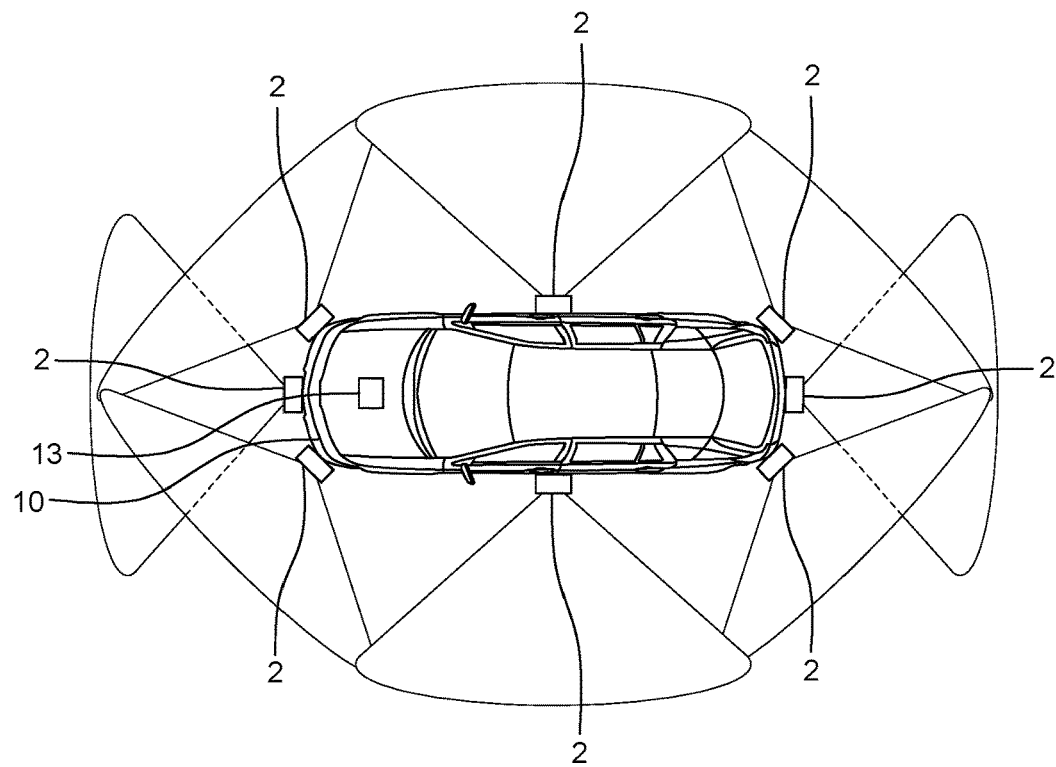
Figure 1C:
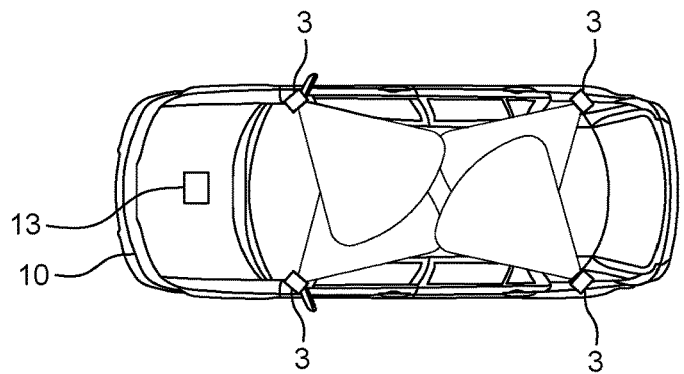

FIGS. 1A-1C illustrate a dual-use detection system 100 according to one or more embodiments. In particular, FIGS. 1A and 1B illustrate two sets of exterior object sensors (e.g., scanning sensors) used for monitoring an exterior environment of a vehicle under assembly 10. A vehicle under assembly 10 includes at least a vehicle chassis and may include additional vehicle parts and components that are added to the vehicle chassis during production. One set of exterior object sensors shown in FIG. 1A includes production sensors 1 arranged around a perimeter 11 of a production cell 12 (i.e., around a perimeter of the vehicle under assembly 10) and scan inwardly from the perimeter 11 of the production cell 12 towards the vehicle under assembly 10. Another set of exterior object sensors shown in FIG. 1B includes vehicle sensors 2 (e.g., radar sensors, Light Detection and Ranging (LIDAR) sensors, time-of-flight 3D cameras, ultrasonic sensors, RGB-cameras, charge-coupled device (CCD) sensors, etc.) that are installed on the vehicle under assembly 10. The vehicle sensors 2 scan outwardly from the vehicle under assembly 10 into the exterior environment.

FIG. 1C illustrates a set of interior object sensors that includes vehicle sensors 3 (e.g., pressure sensors, contact switches, 3D magnetic sensors, radar sensors, Light Detection and Ranging (LIDAR) sensors, time-of-flight 3D cameras, ultrasonic sensors, RGB-cameras, charge-coupled device (CCD) sensors, etc.) installed on the vehicle under assembly 10 and are used for monitoring an interior environment (e.g., a passenger compartment) of the vehicle under assembly 10. Together, the vehicle sensors 2 and 3 make up a network of vehicle sensors that are mounted either directly or indirectly to the vehicle chassis.

The vehicle under assembly 10 further includes at least one vehicle controller 13 that is configured to receive sensor data generated by each of the installed vehicle sensors 2 and 3. The vehicle controller 13 may also be referred to as a safety controller.

The vehicle controller 13, for example, may be an electronic control unit (ECU) installed within the vehicle under assembly 10. An ECU is any embedded system in automotive electronics that controls one or more of the electrical systems or subsystems in a vehicle. The ECU may include a microcontroller, a memory, embedded software stored in the memory, inputs, outputs, and communication links.

It is noted that while production sensors 1 are fixed to a particular production cell 12, the installed, inbuilt vehicle sensors 2 and 3 move along the production line with the vehicle under assembly 10, from production cell to production cell. In addition, not all vehicle sensors 2 and 3 may be initially installed, but rather some vehicle sensors 2 and 3 may be installed at different stages of the vehicle assembly. Once a dual-use vehicle sensor 2 and/or 3 is installed, it is permanently installed in the vehicle and it may be activated and used for object detection and tracking during the remaining stages of the vehicle assembly. Furthermore, it will be appreciated that production sensors 1 may be optional during one or more production stages. Here, object detection may be reliant solely on vehicle sensors 2 and 3.

As will be described in greater detail, vehicle sensors 2 and 3 serve a "dual-use" in that are used for both in vehicle production and in post vehicle product during vehicle operation. This requires two types of control software to be loaded into the vehicle controller 13. Control software may also refer to differently trained aNN programmings for production and driving applications.

For example, during an initial phase of production, the vehicle controller 13 may be installed into the vehicle under assembly 10 with production control software 14 loaded into memory 17. Alternatively, the production control software 14 may be installed into the vehicle controller 13 shortly after installation of the vehicle controller 13. The production control software 14 is used during production of vehicle under assembly 10 and interacts with the sensor data generated by vehicle sensors 2 and 3 during production. In particular, the production control software 14 is used by the vehicle controller 13 to generate production object data from the sensor data, and analyze the production object data for safety events involving production-specific objects and production zone violations. The production object data may include human objects, vehicle objects (e.g., expected vehicle components), and production objects (e.g., production equipment, such as robots). The vehicle controller 13 is configured to actively monitor for and detect safety events during production of the vehicle based on production object data derived for the sensor data received from vehicle sensors 2 and 3.

Subsequently, during a final phase of production, after vehicle assembly is complete or substantially complete, the memory 17 of vehicle controller 13 is reflashed with driving control software 15 for use in vehicle operation. The driving control software 15 is used during vehicle operation and interacts with the sensor data generated by vehicle sensors 2 and 3 during post production (i.e., during vehicle operation). It will also be appreciated that the memory 17 of the vehicle controller 13 may be reflashed again with repair control software that is used in a similar manner as the production control software 14, but instead directed to the repair of the vehicle at a service station or a repair shop. After repair is complete, the memory 17 of the vehicle controller 13 may be reflashed again with the driving control software 15.

Alternatively, programming for use at a repair shop may be part of the vehicle's released software stack when it leaves production. In other words, additional programming may be included with the driving control software 15 so that the vehicle sensors 2 and 3 can again be used for detecting safety events—similar to the detection used during production but this time in conjunction with vehicle repair.

Thus, the described embodiments propose a technical concept of "dual-use" vehicle-installed object sensors comprising a setup for safeguarding or simplifying the vehicle production process by benefitting from vehicle-installed sensors and scanners which are better suited for close-to-target scanning. Thus, each vehicle-installed sensor and scanner can be used both in production and during operation of the end product.

Figure 2:
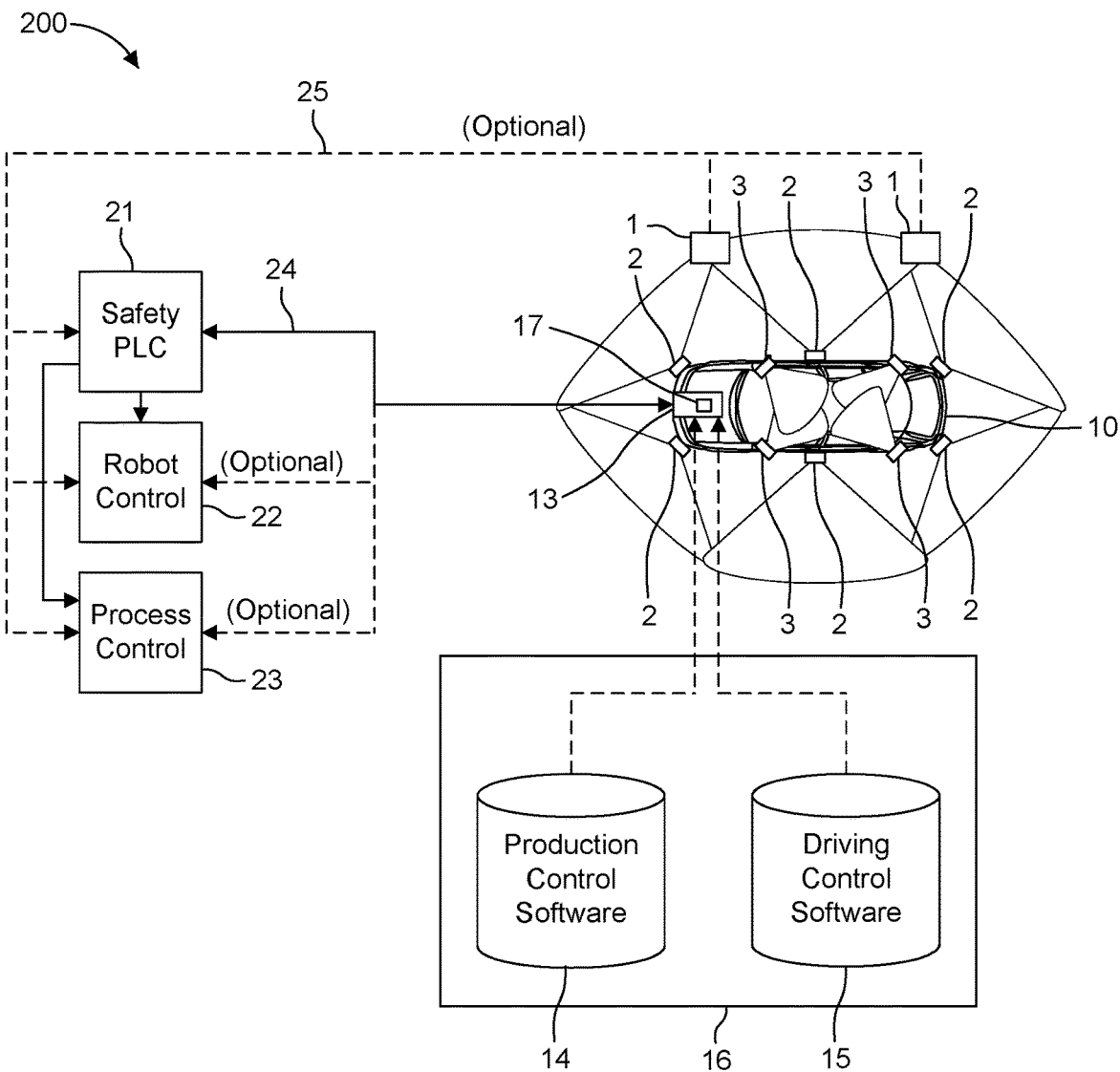
FIG. 2 illustrates a dual-use scanning system according to one or more embodiments.

FIG. 2 illustrates a dual-use detection system 200 according to one or more embodiments. The dual-use detection system 200 is similar to dual-use detection system 100, but includes production control systems used for controlling different machines of the production line. For example, the production control systems may control articulated robot arms and other robotic mechanisms as well as production line mechanisms, such as a conveyor belt. The production control systems include a safety programmable logic controller (PLC) 21, a robot controller 22, and a standard process automated control system 23. Production control software 14 and driving control software 15 are also shown, which are to be loaded into the memory 17 of the vehicle controller 13 as described above. Production control software 14 and driving control software 15 may be installed by a software controller 16, such as a computer, that is communicatively coupled to the vehicle controller 13. The software controller 16 may also be used to reprogram or reconfigure the production control software 14, as will be described in more detail below.

The safety PLC 21 is coupled to the vehicle controller 13 via a fieldbus 24 for receiving sensor data, object data, localization data, warning signals, and/or control signals from the vehicle controller 13 in real-time. While not limited thereto, the fieldbus 24 may use an OPC Unified Architecture (OPC UA), Ethernet Time-Sensitive Networking (TSN), or safe and secure wireless technologies for communication between the safety PLC 21 and the vehicle controller 13. Thus, the fieldbus 24 is representative of a communication channel.

The vehicle controller 13 receives sensor data from vehicle sensors 2 and 3 and may generate object data, localization data, warning signals, and/or control signals based on the sensor data applied to the production control software 14. The production control software 14 includes object presence detection and object localization algorithms adapted to the production of the vehicle under assembly 10. These object presence detection and object localization algorithms are configured to use the sensor data to detect, identify, localize, and track objects during production. The production control software 14 is configured to generate object data, including object identification and localization data, from the sensor data and use the object data to detect, for example, safety events. The object data may also be output from the vehicle controller 13 for use by the robot controller 22 and the standard process automation control system 23 for assisting in production guidance systems.

A safety event (e.g., a safety zone violation) is a potentially hazardous or imminently hazardous situation that occurs involving a human worker or other object located within the production cell, in which a surveilled machine also operating within the production cell may cause bodily harm to the human worker or damage to the other object if the safety PLC 21 does not intervene.

Upon detecting a safety event, the vehicle controller 13 may generate a safety event signal, such as a warning signal or a control signal, and transmit the safety event signal to the safety PLC 21 via the fieldbus 24 or other communication channel. A warning signal may identify a warning type or threat level corresponding to the safety event, and the safety PLC 21 may select one of a plurality of actions to be taken in response to the identified warning type or threat level. For example, the vehicle controller 13 may be configured to assess the threat level based on object type (e.g., human or non-human) and proximity of the object to a perceived threat, with a human object being in close proximity (e.g., less than a predetermined threshold distance) to a perceived threat warranting some action.

At the very least, two types of safety event may be identified, including a non-critical zone violation and a critical zone violation. The non-critical zone violation occurs when a human is less than a first predetermined threshold distance from a surveilled robot, although the surveilled robot is moving away from the person. In this first instance, the surveilled robot may be slowed down. In contrast, a critical zone violation occurs when a person is entering a protected robot space and/or is less than the first predetermined threshold distance from a surveilled robot, and the surveilled robot is moving towards the person. In this second instance, the threat level is higher than in the first instance and the surveilled robot may be stopped. It will also be appreciated that different distances may be used for the different threat levels, including those described above.

Another zone violation may occur when a person is less than a second predetermined threshold distance from a surveilled robot but greater than the first predetermined threshold distance from a surveilled robot, and the surveilled robot is moving towards the person. In this third instance, the threat level is lower than in the above second instance and the surveilled robot may be slowed down. The vehicle controller 13 continues to monitor for a critical zone violation.

Alternatively, the vehicle controller 13 may select one of a plurality of actions to be taken based on the safety event and command the safety PLC 21 to take the selected action via the control signal. Both the warning signal and the control signal may be accompanied with object data that identifies a surveilled machine corresponding to the safety event to which action should be directed to by the safety PLC 21.

Upon receiving the warning signal or the control signal from the vehicle controller 13, the safety PLC 21 may perform one or more safety measures to prevent harm to the human worker or damage to an object, including taking control of a surveilled machine corresponding to the safety event. Control of the surveilled machine may include triggering a slow-down in the surveilled machine's operational speed or even triggering a complete "safe-stop" of the surveilled machine, depending on the penetration level and the assessed threat level to the human worker or object. If a safe-stop is triggered by the safety PLC 21, the safety PLC 21 may hold the position of the surveilled machine for at least a predetermined amount of time. Additionally, the safety PLC 21 may require a manual restart in order to restart production after a safety event occurs.

Additionally, or alternatively, the vehicle controller 13 may be configured to as an interface to receive the sensor data from the vehicle sensors 2 and 3 and seamlessly forward the sensor data to the safety PLC 21 for object detection, identification, localization, and tracking. In this case, the safety PLC 21 is configured to receive the sensor data in real-time from the vehicle sensors 2 and 3, via the vehicle controller 13, for generating object data. Based on the sensor data, the safety PLC 21 detects, classifies, localizes, and tracks objects within the production cell, including identifying humans and machines, and detects a safety event (e.g., a safety zone violation) based on the detected objects, should one occur. Thus, any of the functions described herein as being performed by the vehicle controller 13 may additionally or alternatively be performed by the safety PLC 21 based on received sensor data and/or object data. Additionally, the PLC 21 may be further configured to assess the threat level to the human worker or object, and take one of a plurality of measures based on the determined threat level.

Mixed setups are also possible in which both the vehicle controller 13 and the safety PLC 21 received the sensor data from the vehicle sensors 2 and 3 in order to detect, classify, localize, and track objects within the production cell.

As a result of using the vehicle sensors 2 and 3 for object detection during production, the vehicle controller 13 and at least one exterior vehicle sensor 2 and/or interior vehicle sensor 3 should be installed during an initial phase of the production sequence, with the possibility of adding additional vehicle sensors 2 and 3 at later phases of the production sequence.

In addition, the safety PLC 21 may optionally be coupled to one or more production sensors 1 via a fieldbus 25 for receiving sensor data generated by the production sensors 1. While not limited thereto, the fieldbus 25 may use an OPC UA, Ethernet TSN, or wireless technologies for communication between the safety PLC 21 and the production sensors 1. Thus, the fieldbus 25 is representative of a communication channel. Here, the safety PLC 21 may be configured to generate additional object data based on the sensor data received from the production sensors 1 and use the additional object data for detecting a safety event.

The robot controller 22 is configured to control robotic mechanisms used in a production line, and more particularly in one or more production cells. The robot controller 22 is different from the safety PLC 21 in that the robot controller 22 is configured to control the robotic mechanisms according to an assembly sequence of the vehicle under assembly 10 based on a programmed assembly control software. Thus, vehicle components are installed onto or into the vehicle under assembly 10 via the robot controller 22.

The robot controller 22 is optionally coupled to the vehicle controller 13 for receiving sensor data or object data from the vehicle controller 13. The sensor data may be used by the robot controller 22 to generate object data to aid with the vehicle assembly. For example, the robot controller 22 may detect, classify, and localize objects to be moved by an articulated robot arm. Thus, the sensor data may be used by the robot controller 22 for tool steering, object positioning, and to guide the movement of a robot mechanism to one or more objects detected with the sensor data. Alternatively, the robot controller 22 may receive object data from the vehicle controller 13, which may be used for controlling the movement at least one surveilled machine.

In general, the vehicle controller 13 is configured with production control software 14 that enables the vehicle controller 13 to generate production object data from the sensor data, monitor a position of at least one surveilled machine (e.g., at least one production machine, such as a robot arm) based on the production object data, and generate position information based on the position of the at least one surveilled machine. The robot controller 22 may receive the position information and control a movement of the at least one surveilled machine based on the position information. Alternatively, the robot controller 22 may generate the position information used for machine control based on the object data received from the vehicle controller 13. Thus, the robot controller 22 may be used for non-safety related control, such as tool steering, object positioning, and quality inspections during production. The robot controller 22 can operate in this manner with or without the inclusion of the safety PLC 21 used for safety aspects. In other words, the embodiments are not restricted to safety aspects and may be used with or without the safety PLC 21.

The robot controller 22 is optionally coupled to the production sensors 1 for similar purposes. The sensor data may be used by the robot controller 22 to generate object data to aid with the vehicle assembly, including guiding the movement of a robot mechanism to one or more objects detected with the sensor data.

The robot controller 22 is also communicatively coupled to the safety PLC 21 for receiving a control signal from the safety PLC 21. The safety PLC 21 may generate a control signal in response to detecting or receiving notification of a safety event and transmit the control signal to the robot controller 22 for controlling the robot controller 22. For example, the control signal may instruct the robot controller 22 to slow down or stop a surveilled machine that corresponds to the detected safety event.

The standard process automated control system 23 is a production line controller configured to control production line mechanisms, such as a conveyor belt or production track, including transport automate guided vehicles (AGVs) and autonomous mobile robots (AMRs). The standard process automated control system 23 is different from the safety PLC 21 in that the standard process automated control system 23 is configured to control the production line mechanisms according to an assembly sequence of the vehicle under assembly 10 based on a programmed assembly control software. Thus, the vehicle under assembly 10 is moved along the production line and advanced from one production stage to the next via the standard process automated control system 23.

The standard process automated control system 23 is optionally coupled to the vehicle controller 13 for receiving sensor data or object data from the vehicle controller 13. The sensor data may be used by the standard process automated control system 23 to generate object data to aid with the vehicle assembly. For example, the standard process automated control system 23 may detect and localize the vehicle under assembly 10, as well as its components, in order to regulate a speed of the production line mechanisms. For example, the standard process automated control system 23 may detect whether a production stage is complete and, if so, advance the vehicle under assembly 10 to the next production stage. Alternatively, the object data received from the vehicle controller 13 may be used for this purpose. Thus, the standard process automated control system 23 may be used for non-safety related control of the production line mechanisms, for example, for object positioning and quality inspections during production. The standard process automated control system 23 can operate in this manner with or without the inclusion of the safety PLC 21 used for safety aspects. In other words, the embodiments are not restricted to safety aspects and may be used with or without the safety PLC 21.

The standard process automated control system 23 is optionally coupled to the production sensors 1 for similar purposes. The sensor data may be used by the standard process automated control system 23 to generate object data to aid with the vehicle assembly, including guiding and regulating the production line mechanisms.

The standard process automated control system 23 is also communicatively coupled to the safety PLC 21 for receiving a control signal from the safety PLC 21. The safety PLC 21 may generate a control signal in response to detecting or receiving a notification of a safety event and transmit the control signal to the standard process automated control system 23 for controlling the standard process automated control system 23. For example, the control signal may instruct the standard process automated control system 23 to slow down or stop the production line mechanism of a production cell corresponding to the detected safety event.

Based on the dual-use detection system 200, inbuilt sensors 3 for monitoring a vehicle interior (e.g., used for passenger detection and/or scanning in vehicle operation) and exterior sensors 2 for external environment scanning (e.g., used for driving assistance in vehicle operation) are used for detection and scanning purposes during vehicle production. As a result, the number of separate and expensive detection devices for production purposes can be reduced and the observed field-of-view is improved. Thus, the vehicle sensors may help to lower production costs while enhance safety since the vehicle sensors are already present in the vehicle, cost efficient, smart and have high performance. Scanner/sensor duplication between vehicle provided own setups and separate production line setups can be avoided. Furthermore, the vehicle's own interior scanners are already located in the best possible areas to guarantee most efficient field-of-view setups, even when assembly progresses. Much better detection setup can be achieved with the vehicle's own interior sensors/scanners than trying to enable collaborative working setups on the vehicle's interior with scanning infrastructure from the exterior.

In order to achieve this production setup, the data from the various detection functions of the vehicle are made available to external process and safety controllers 21-23 via a wired or a wireless communication infrastructure. The embedded algorithmic controls (i.e., production control software 14 and driving control software 15) of the various vehicle sensors and scanners 2 and 3 need to be programmed differently between production and driving operation; switching to driving operation latest, when the vehicle leaves the production line. Thus, existing vehicle infrastructure, here scanners and sensors 2 and 3, is reused to streamline the production process.

In order to introduce the above concept to the next generation of vehicle production, one or more of the following changes may be implemented:

(1) the vehicle design for scanner/sensor setups may be modified from current designs such that scanners and sensors are installed onto the vehicle under assembly early in the production sequence in order to enable the highest efficiency effect of using vehicle scanners and sensors for production;

(2) vehicle and process control systems may be interfaced in a standard way, which does not interfere with existing vehicle control and production automation control architectures (hardware and software);

(3) this new interface may be highly secured in order to avoid hacker attacks which could violate safety concepts of the vehicle;

(4) the control algorithms may be adapted for production and traffic related aspects;

(5) fast communication links and reprogramming infrastructure may be provided that allow the vehicle scanner and sensor functionality to be updated towards the end of assembly, before the vehicle leaves the production line;

(6) traditional 2D LIDAR-only scanning concepts may be replaced by more powerful, sensor fusion-oriented approaches by combinations of 3D scanning concepts of Time-of-Flight and Radar; and (7) machine learning algorithms for advanced object detection algorithms and embedded artificial neural network technology within smart sensors and smart scanners may be actively deployed.

As described above, the vehicle scanners and sensors 2 and 3 are interfaced in real-time to an external safety PLC 21, a robot controller 22, and a standard process automation control system 23. The vehicle controller 13 is able to seamless exchange its embedded sensor/scanner data in real-time with the externally connected production control systems 21-23 using, for example, OCP-UA, Ethernet-TSN, advanced wireless technologies, and the like.

Vehicle mounted scanners and sensors 2 and 3 and embedded edge controllers are used by object presence detection, object classification, and object localization algorithms of the production control software 14 during production. These object presence detection and object localization algorithms are configured to use sensor data to detect, identify, classify, localize, and track objects during production. This object data may be used by the external safety PLC 21 during production to detect, for example, safety events and may be used by the robot controller 22 and the standard process automation control system 23 as object information for production guidance systems.

During the final phase of production, after vehicle assembly, the vehicle controller 13 is reprogrammed or reconfigured with driving control software 15 in a fast and efficient way without violating the various required safety concepts for production and traffic. The driving control software 15 includes object presence detection, object classification, and object localization algorithms configured for driving applications, including, but not limited to, driving assistance (e.g., lane assist, parking assist, adaptive cruise control, traffic sign detection, etc.) and active (passenger) safety systems. Thus, these object presence detection and object localization algorithms are configured to use sensor data to detect, identify, classify, localize, and track objects during vehicle operation, post assembly.

Figure 3A:
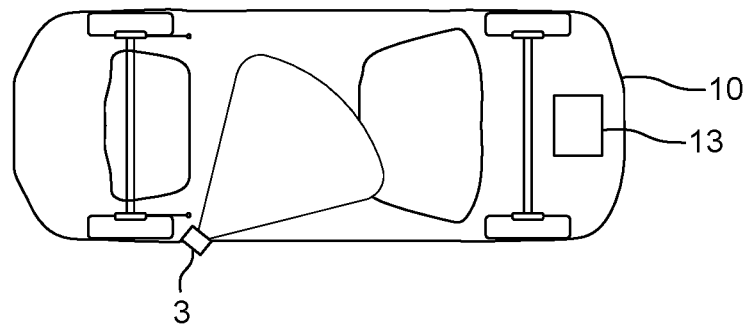
FIGS. 3A and 3B illustrate a vehicle chassis of a vehicle under assembly at two stages of production according to one or more embodiments.
Figure 3B:
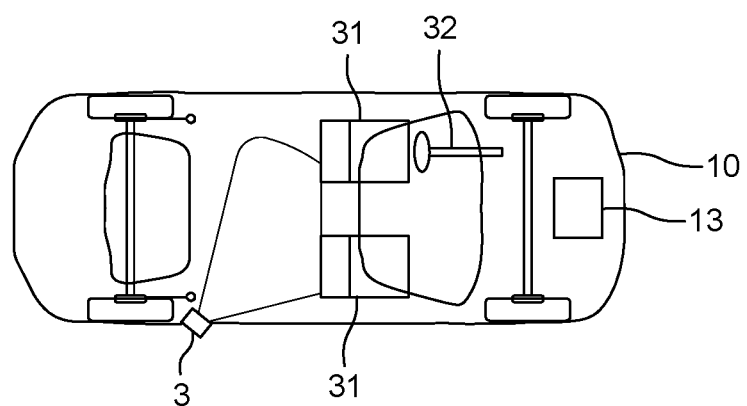

FIGS. 3A and 3B illustrate a vehicle chassis of a vehicle under assembly 10 at two stages of production according to one or more embodiments. In particular, FIG. 3A illustrates the vehicle chassis of the vehicle under assembly 10 that is empty with the exception of vehicle controller 13 and one or more vehicle sensors 2 and 3. For simplicity, only one interior vehicle sensor 3 is shown. In contrast, FIG. 3B illustrates the vehicle chassis of the vehicle under assembly 10 at a subsequent production stage, after which front seats 31 and a steering wheel 32 is installed into the vehicle chassis.

In order to account for different stages of production, reprogramming and reconfiguration of the production control software 14 may be performed multiple times during production according to a current assembly state of the vehicle under assembly 10. For example, as demonstrated in FIGS. 3A and 3B, the interior and exterior composition of the vehicle under assembly 10 will change as components are added to the vehicle through various stages of assembly. Thus, the observed space monitored by the vehicle sensors 2 and 3 changes frequently throughout production.

Moreover, the production control software 14 may be updated as additional vehicle sensors 2 and/or 3 are mounted to the vehicle under assembly 10 through various production stages. Thus, the production control software 14 may be updated when additional sensors 2 and/or 3 are activated.

As a result, the vehicle controller 13 should be reconfigured via updated production control software 14 so that the vehicle controller 13 is capable of differentiating known, expected objects from unexpected objects and critical objects (e.g., humans) in order to avoid triggering a false safety event and in order to better assist in production guidance systems. Thus, the production control software 14 may be updated after installation of a vehicle component to the vehicle under assembly 10 to identify the installed vehicle component as an expected object. Without this adaptation of the production control software 14, the vehicle controller 13 may report false alarms or incorrect localization data. Additionally, the production control software 14 may be updated after installation of a sensor component to the vehicle under assembly 10 to increase or enhance the area coverage of the network of sensors.

Frequent adaptions for the vehicle sensors 2 and 3 can be also seen as modified mission profiles for the vehicle sensors 2 and 3. Thus, the production control software 14 may include multiple mission profiles that are, for example, assigned or mapped to one or more production stages. The vehicle controller 13 may receive production information from, for example, the standard process automation control system 23 that identifies the current production stage of the production line in which the vehicle under assembly resides. Using the production information, the vehicle controller 13 may selectively activate one of the mission profiles and deactivate the other mission profiles in order for the production control software 14 to be aligned with the current production stage. A mission profile may account for a current assembled state of the vehicle under assembly 10, including installed vehicle components and vehicle sensors 2 and 3. The different mission profiles make a difference in terms of supported field-of-view, object detection, and alarming scenarios.

In order to provide better control within the various mission profiles, object and detection categorization can be performed by the production control software 14 using an aNN with machine learning and/or deep learning. As the required modification of the scanned field-of-view is fully known according to the vehicle's actual assembly stage, it will be possible to teach an aNN how the environment has changed and what are currently expected obstacles and what is different from the expected scanning setup, thus requiring system attention. As there are low-cost aNN solutions currently being developed, such aNN solutions could be directly paired with each corresponding sensing system, making it a smart sensor. Field-of-view shaping according to the expected obstacle setup can be done as aNN training during initial production line start-up and also to cope with vehicle variants and further can be "powered" by massive cloud computing. Once configuration parameters for the aNN have been optimized, they can be fed into a local aNN where they are fixed without any further modification, also to comply with safety standards.

The configuration parameters for the aNN refers to the calculated weights of each neuron's transfer function. These weight calculations are being performed during aNN training and require high computing power. Once the weights have been retrieved, categorization and prediction is performed.

Especially pairing visual scanning technologies with radar opens new technical opportunities for scanner setups. Before, identifying objects or determining obstacle presence was based on geometric analysis within higher level algorithmic layers (edge or basic shape detection, etc.) or simple (high-resolution) reflection measurements. Radar offers the additional opportunity to also extract information about the material of a scanned object (e.g., metal versus a human body) to aid in object identification. This capability could complement a combined scanner not just for safety aspects but also for advanced object differentiation capabilities by enabling a combined material and objects detection during the production process that can used for quality check during assembly. This may help reduce the number of false safety events or the number of undetected safety events by ensuring that a human objects are detected quickly and correctly.

In view of the above, opening and extending a vehicle's inbuilt sensing and scanning solutions early in production for enablement of a more advanced vehicle assembly will prepare the path to higher automation levels at attractive automation costs.

According to one or more embodiments, a vehicle assembly system includes a vehicle chassis of a vehicle; at least one object sensor mounted to the vehicle chassis, wherein the at least one object sensor generates sensor data based on at least one detected object; at least one processor configured to receive the sensor data from the at least one object sensor, wherein, during assembly, the at least one processor is configured with production control software that enables the at least one processor to generate production object data from the sensor data, monitor for a safety event based on the production object data, and generate a safety event signal in response to detecting the safety event; and a safety controller configured to receive the safety event signal from the at least one processor and alter a movement of a surveilled machine corresponding to the safety event. The at least one processor may be integrated in a vehicle controller 13 that is mounted to the vehicle chassis, may be integrated in the safety controller (i.e., the safety PLC 21), or may be integrated in both the vehicle controller 13 and the safety controller, such that one or more actions is performed by the vehicle controller 13 and the remaining actions are performed by the safety controller.

According to one or more embodiments, a vehicle assembly system includes a vehicle chassis of a vehicle; at least one object sensor mounted to the vehicle chassis, wherein the at least one object sensor generates sensor data based on at least one detected object; at least one processor configured to receive the sensor data from the at least one object sensor, wherein, during assembly, the at least one processor is configured with production control software that enables the at least one processor to generate production object data from the sensor data, monitor a position of at least one surveilled machine based on the production object data, and generate position information based on the position of the at least one surveilled machine; and a controller configured to receive the position information and control a movement of the at least one surveilled machine based on the position information. The at least one processor may be integrated in a vehicle controller 13 that is mounted to the vehicle chassis, may be integrated in the safety controller (i.e., the safety PLC 21), or may be integrated in both the vehicle controller 13 and the safety controller, such that one or more actions is performed by the vehicle controller 13 and the remaining actions are performed by the safety controller.

While various embodiments have been described, it will be apparent to those of ordinary skill in the art that many more embodiments and implementations are possible within the scope of the disclosure. Additionally, it will be appreciated that the concepts described herein can be extended to non-automotive manufacturing in which sensors mounted to an article of manufacturer are used during production for similar purposes described herein. Accordingly, the invention is not to be restricted except in light of the attached claims and their equivalents. With regard to the various functions performed by the components or structures described above (assemblies, devices, circuits, systems, etc.), the terms (including a reference to a "means") used to describe such components are intended to correspond, unless otherwise indicated, to any component or structure that performs the specified function of the described component (i.e., that is functionally equivalent), even if not structurally equivalent to the disclosed structure that performs the function in the exemplary implementations of the invention illustrated herein.

Furthermore, the following claims are hereby incorporated into the detailed description, where each claim may stand on its own as a separate example embodiment. While each claim may stand on its own as a separate example embodiment, it is to be noted that—although a dependent claim may refer in the claims to a specific combination with one or more other claims—other example embodiments may also include a combination of the dependent claim with the subject matter of each other dependent or independent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective acts of these methods.

Further, it is to be understood that the disclosure of multiple acts or functions disclosed in the specification or claims may not be construed as to be within the specific order. Therefore, the disclosure of multiple acts or functions will not limit these to a particular order unless such acts or functions are not interchangeable for technical reasons. Furthermore, in some embodiments a single act may include or may be broken into multiple sub acts. Such sub acts may be included and part of the disclosure of this single act unless explicitly excluded.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure. Such hardware, software, and firmware may be implemented within the same device or within separate devices to support the various techniques described in this disclosure.

Furthermore, a computing system or program, such as trained aNN may be implemented by one or more processors and/or control units. An aNN is an adaptive tool for non-linear statistical data modeling that changes its structure based on external or internal information that flows through a network during a learning phase. aNNs are non-linear statistical data modeling tools used to model complex relationships between inputs and outputs or to find patterns in data.

Although various exemplary embodiments have been disclosed, it will be apparent to those skilled in the art that various changes and modifications can be made which will achieve some of the advantages of the concepts disclosed herein without departing from the spirit and scope of the invention. It will be obvious to those reasonably skilled in the art that other components performing the same functions may be suitably substituted. It is to be understood that other embodiments may be utilized and structural or logical changes may be made without departing from the scope of the present invention. It should be mentioned that features explained with reference to a specific figure may be combined with features of other figures, even in those not explicitly mentioned. Such modifications to the general inventive concept are intended to be covered by the appended claims and their legal equivalents.

What is claimed is:

1. A vehicle assembly system, comprising:
   a vehicle chassis of a vehicle to be assembled;
   at least one object sensor mounted to the vehicle chassis, wherein the at least one object sensor generates sensor data based on at least one detected object; and
   at least one processor configured to receive the sensor data from the at least one object sensor,
      wherein, during assembly of the vehicle, the at least one processor is configured with production control software that enables the at least one processor to generate production object data from the sensor data, identify a surveilled machine configured to assemble a portion of the vehicle during assembly of the vehicle based on the production object data, monitor a position of the surveilled machine based on the production object data, and monitor the surveilled machine based on the production object data corresponding to another detected object and the monitored position of the surveilled machine relative to the other detected object,
   wherein neither the surveilled machine nor the other detected object is the vehicle chassis or a vehicle component mechanically fixed to the vehicle chassis,
   wherein the vehicle is assembled over a plurality of production stages such that a vehicle composition changes over the plurality of production stages,
   wherein the production control software comprises a plurality of profiles for detecting a safety event, each of the plurality of profiles being mapped to a corresponding production stage of the plurality of production stages, and each of the plurality of profiles being associated with a different vehicle composition associated with the corresponding production stage and one or more surveilled machines associated with the corresponding production stage,
   wherein the at least one processor is configured to selectively activate and deactivate the plurality of profiles for detecting the safety event based on a current production stage to which an activated profile corresponds,
   wherein the at least one processor is configured to monitor for the safety event based on the different vehicle composition and the one or more surveilled machines, which are associated with the activated profile that is mapped to the current production stage, and
   wherein the surveilled machine is one of the one or more surveilled machines associated with the current production stage.

2. The vehicle assembly system of claim 1, wherein the at least one processor is configured to monitor for the safety event involving the surveilled machine based on the production object data corresponding to the other detected object and the monitored position of the surveilled machine relative to the other detected object, and generate a safety event signal in response to detecting the safety event.

3. The vehicle assembly system of claim 2, further comprising:
   a safety controller configured to receive the safety event signal from the at least one processor and alter a movement of the surveilled machine corresponding to the safety event.

4. The vehicle assembly system of claim 1, wherein the surveilled machine is an articulated robot arm.

5. The vehicle assembly system of claim 1, wherein the at least one object sensor includes at least one interior object sensor configured to scan an interior environment of the vehicle chassis and at least one exterior object sensor configured to scan an exterior environment of the vehicle chassis.

6. The vehicle assembly system of claim 1, wherein:
   the at least one processor is configured to monitor for a safety event involving the surveilled machine based on the production object data corresponding to the other detected object and the monitored position of the surveilled machine relative to the other detected object, and the at least one processor is configured to detect whether the production object data includes a human object and detect the safety event based on the at least one processor detecting the human object within a predetermined threshold distance from the surveilled machine.

7. The vehicle assembly system of claim 6, wherein:
the at least one processor is configured to determine a threat level of the safety event out of a plurality of threat levels based on the production object data and generate a safety event signal in response to detecting the safety event,
the safety event signal includes threat level information corresponding to the determined threat level.

8. The vehicle assembly system of claim 7, further comprising:
a safety controller configured to receive the safety event signal from the at least one processor and alter a movement of the surveilled machine corresponding to the safety event,
wherein the safety controller is configured to select one of a plurality of actions for altering the movement of the surveilled machine based on the threat level information.

9. The vehicle assembly system of claim 7, wherein the plurality of threat levels include:
a first threat level identified based on the at least one processor detecting the human object being within the predetermined threshold distance from the surveilled machine while the surveilled machine is moving away from the human object, and
a second threat level identified based on the at least one processor detecting the human object being within the predetermined threshold distance from the surveilled machine while the surveilled machine is moving towards the human object.

10. The vehicle assembly system of claim 1, further comprising:
a production controller configured to track the current production stage of the vehicle and transmit production stage information to the at least one processor, the production stage information indicating the current production stage,
wherein the at least one processor is configured to selectively activate one of the plurality of profiles based on the current production stage indicated by the production stage information.

11. The vehicle assembly system of claim 1, wherein:
each of the plurality of profiles includes a different set of expected objects mounted to the vehicle chassis that defines the vehicle composition, and
the at least one processor is configured to differentiate between an unexpected object and an expected object based on the activated profile for detecting the safety event.

12. The vehicle assembly system of claim 11, wherein detecting the expected object avoids triggering a false safety event.

13. The vehicle assembly system of claim 1, wherein the vehicle assembly system further comprises:
a software controller configured to update the production control software based on the current production stage of the plurality of production stages, wherein the updated production control software enables the at least one processor to monitor for the safety event involving the surveilled machine that is present in the current production stage, wherein the safety event to be monitored is adapted to the current production stage based on a set of expected objects mounted to the vehicle chassis that defines the vehicle composition.

14. The vehicle assembly system of claim 13, wherein the at least one processor is configured to differentiate between an unexpected object and an expected object based on the activated profile for detecting the safety event.

15. The vehicle assembly system of claim 1, further comprising:
a vehicle controller mounted to the vehicle chassis, wherein the vehicle controller comprises the at least one processor.

16. The vehicle assembly system of claim 15, further comprising:
a software controller configured to reflash the at least one processor with driving control software thereby overwriting the production control software, wherein the driving control software enables the at least one processor to generate driving object data from the sensor data and apply the driving object data to at least one driving functionality during a driving operation of the vehicle.

17. The vehicle assembly system of claim 16, wherein the software controller is configured to reflash the at least one processor with the driving control software during a final phase of vehicle assembly.

18. The vehicle assembly system of claim 16, wherein the at least one driving functionality includes at least one of vehicle lane assist, vehicle parking assist, adaptive cruise control, traffic sign detection, or passenger detection.

19. The vehicle assembly system of claim 1, further comprising:
a controller configured to control a movement of the surveilled machine based on the monitored position of the surveilled machine relative to the other detected object.

20. A method of assembling a vehicle, comprising:
mounting at least one object sensor to a vehicle chassis of the vehicle to be assembled;
generating, by the at least one object sensor, sensor data based on at least one object detected by the at least one object sensor;
installing production control software in a memory of at least one processor, wherein the production control software is configured for use during assembly of the vehicle;
generating, by the at least one processor based on the production control software, production object data from the sensor data;
identifying, by the at least one processor based on the production control software, a surveilled machine configured to assemble a portion of the vehicle during assembly of the vehicle based on the production object data;
monitoring, by the at least one processor based on the production control software, a position of the surveilled machine based on the production object data;
monitoring, by the at least one processor based on the production control software, the surveilled machine based on the production object data corresponding to another detected object and the monitored position of the surveilled machine relative to the other detected object,
wherein neither the surveilled machine or the other detected object is the vehicle chassis or a vehicle component mechanically fixed to the vehicle chassis, wherein the vehicle is assembled over a plurality of production stages such that a vehicle composition changes over the plurality of production stages, wherein the production control software comprises a plurality of profiles for detecting a safety event, each of the plurality of profiles being mapped to a corresponding production stage of the plurality of production stages, and each of the plurality of profiles being associated with a different vehicle composition associated with the corresponding production stage and one or more surveilled machines associated with the corresponding production stage;

selectively activating and deactivating, by the at least one processor based on the production control software, the plurality of profiles for detecting the safety event based on a current production stage to which an activated profile corresponds; and monitoring, by the at least one processor based on the production control software, for the safety event based on the different vehicle composition and the one or more surveilled machines, which are associated with the activated profile that is mapped to the current production stage, wherein the surveilled machine is one of the one or more surveilled machines associated with the current production stage.

21. The method of claim 20, further comprising:

monitoring, by the at least one processor based on the production control software, for the safety event involving the surveilled machine based on the production object data corresponding to the other detected object and the monitored position of the surveilled machine relative to the other detected object;

generating, by the at least one processor based on the production control software, a safety event signal in response to detecting the safety event; and altering, by a safety controller, a movement of the surveilled machine corresponding to the safety event based on the safety event signal.

* * * * *